May 28, 1929.  E. O. BEARDSLEY ET AL  1,715,114
CAGE FOR ROLLER BEARINGS
Filed July 29, 1925
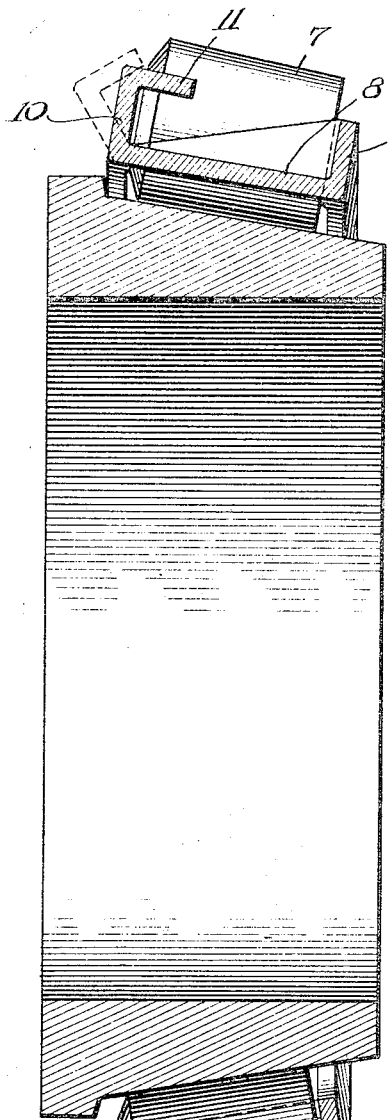
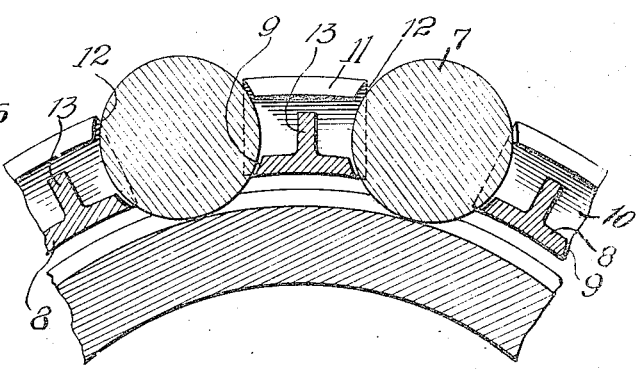
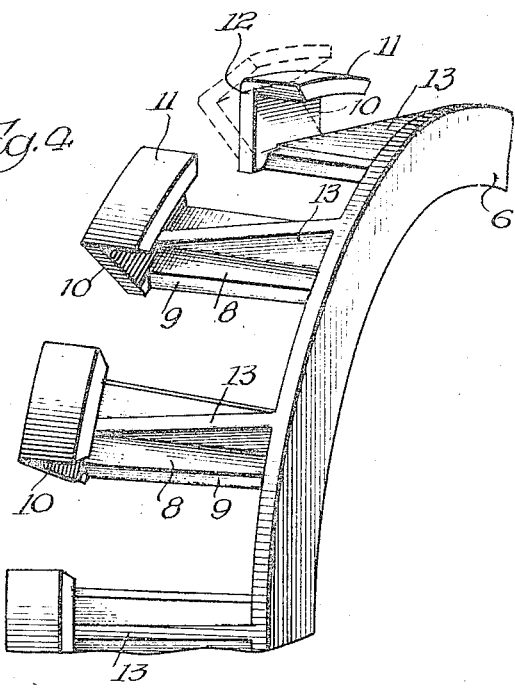
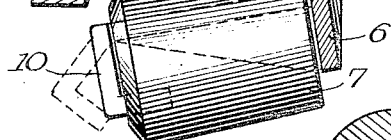
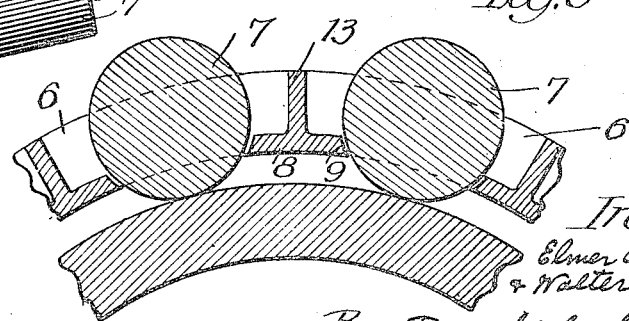

Patented May 28, 1929.

1,715,114

UNITED STATES PATENT OFFICE.

ELMER O. BEARDSLEY AND WALTER F. PIPER, OF CHICAGO, ILLINOIS, ASSIGNORS TO THE BEARDSLEY & PIPER COMPANY, OF CHICAGO, ILLINOIS, A CORPORATION OF ILLINOIS.

CAGE FOR ROLLER BEARINGS.

Application filed July 29, 1925. Serial No. 46,720.

The invention relates to improvements in cages for roller bearings.

One object is to provide a cage which is particularly adapted for the larger sizes of roller bearings, and which is simple in construction, so that excessive weight is avoided. Another object of the invention is to provide a cage of this character in which the retaining lugs at one side of the cage are bendably supported by cross-bars in such a manner that bending of the cross-bars is prevented while the lugs are being bent into their operative position.

The invention consists in the several novel features hereinafter set forth and more particularly defined by claims at the conclusion hereof.

In the drawing: Fig. 1 is a longitudinal section of a bearing embodying the invention. Fig. 2 is a transverse section looking toward one side of the cage. Fig. 3 is a similar view, looking toward the other side of the cage. Fig. 4 is a perspective of a portion of the cage.

The invention is exemplified in a cage formed of a single casting and comprising a ring 6 which is disposed contiguously to one end of the rollers 7 and adapted to hold them against endwise movement in one direction; cross-bars 8 integral with said ring and extending transversely from the inner margin thereof with edges 9 disposed radially inward of the axes of the rollers, so that they will be confined against inward radial displacement from the cage; lugs 10, integral with bars 8 respectively, and disposed contiguously to the opposite ends of the rollers to confine them against endwise displacement in the opposite direction; and tongues 11, integral with the lugs 10, and extending transversely from the outer ends of the lugs toward the side ring 6 with edges 12 disposed contiguously to the peripheries of the rollers, so that they will confine them against outward radial displacement. Edges 9 of cross-bars 8 and the edges 12 of tongues 11 are curved conformably to the contiguous portions of the peripheries of the rollers, so that the latter will be free to rotate, but confined against inward or outward radial displacement.

The cage is formed of suitable metal, such as brass or bronze, which permits the lugs 10 to be bent into their operative position after the rollers have been put in place in the cage. Normally, the lugs 10 extend obliquely from the bars 8, so that the tongues 12 will provide sufficient clearance for the insertion of the rollers into their places. In practice, it has been found, particularly in the larger sizes of bearings, that the bending of the lugs 10 is likely to result in bending the cross-bars 8, and to prevent this from occurring, ribs 13 are provided which are integral with the cage and which extend from the ring 6 transversely over the outer peripheries of the cross-bars 8 and terminate at points adjacent the junction of the cross-bars and the lugs 10. These ribs have been found to effectively prevent the bending of the cross-bars which is likely to result in binding the rollers in the cage. The tongues 11, when in their operative position, are disposed and extend transversely toward the ring a sufficient distance so that the ring 6 will act to confine the contiguous ends of the rollers against radial outward displacement, as well as endwise displacement in one direction.

The invention exemplifies a cage for roller bearings, in which transverse tongues at one side thereof coact with a ring at the other side to confine the rollers against outward displacement without additionally providing transversely extending means on the ring for that purpose, which is desirable for bearings of the larger sizes where it is desired to reduce the weight of the cage as much as possible. The invention also exemplifies a cage which is provided with bendable tongue carrying lugs on cross-bars, in which provision is made to prevent undesirable bending of the cross-bars by the bending of the lugs into or out of their operative positions.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. A cage for roller bearings formed of a casting and comprising a side ring adapted to confine one end of the rollers, cross-bars integral with said ring having their edges disposed inwardly of the roller-axes to confine the rollers against inward radial displacement, lugs integral with the bars respectively, extending radially outward at the other side, tongues integral with the lugs extending toward the ring with edges disposed radially outward of the roller-axes to confine the rollers against outward displacement, the lugs being bendably connected to the cross-bars so they may be forced into operative position after the rollers have been inserted in place and means to reinforce the bars to prevent them from being bent relatively to the ring during bending of the lugs.

2. A cage for roller bearings formed of a casting and comprising a side ring adapted to confine one end of the rollers, cross-bars integral with said ring having their edges disposed inwardly of the roller-axes to confine the rollers against inward radial displacement, lugs integral with the bars respectively extending radially outward at the other side, tongues integral with the lugs and extending toward the ring with edges disposed radially outward of the roller-axes to confine the rollers against outward displacement, the lugs being bendably connected to the cross-bars so they and the tongues may be forced into operative position after the rollers have been inserted in place, and transverse ribs connected directly to the ring and the bars, said ribs extending from the ring to points adjacent the lugs and being adapted to prevent the bars from being bent with the lugs.

3. A cage for roller bearings formed of a casting and comprising a side ring adapted to confine one end of the rollers, cross-bars integral with said ring having their edges disposed inwardly of the roller-axes to confine the rollers against inward radial displacement, lugs integral with the bars respectively extending radially outward at the other side, tongues integral with the lugs and extending toward the ring with edges disposed radially outward of the roller-axes to confine the rollers against outward displacement, the lugs being bendably connected to the cross-bars so they and the tongues may be forced into operative position after the rollers have been inserted in place, and transverse ribs integral with the ring and the bars, said ribs being tapered from the ring to points adjacent the lugs and adapted to prevent the bars from being bent with the lugs.

ELMER O. BEARDSLEY.
WALTER F. PIPER.